United States Patent Office 3,583,909
Patented June 8, 1971

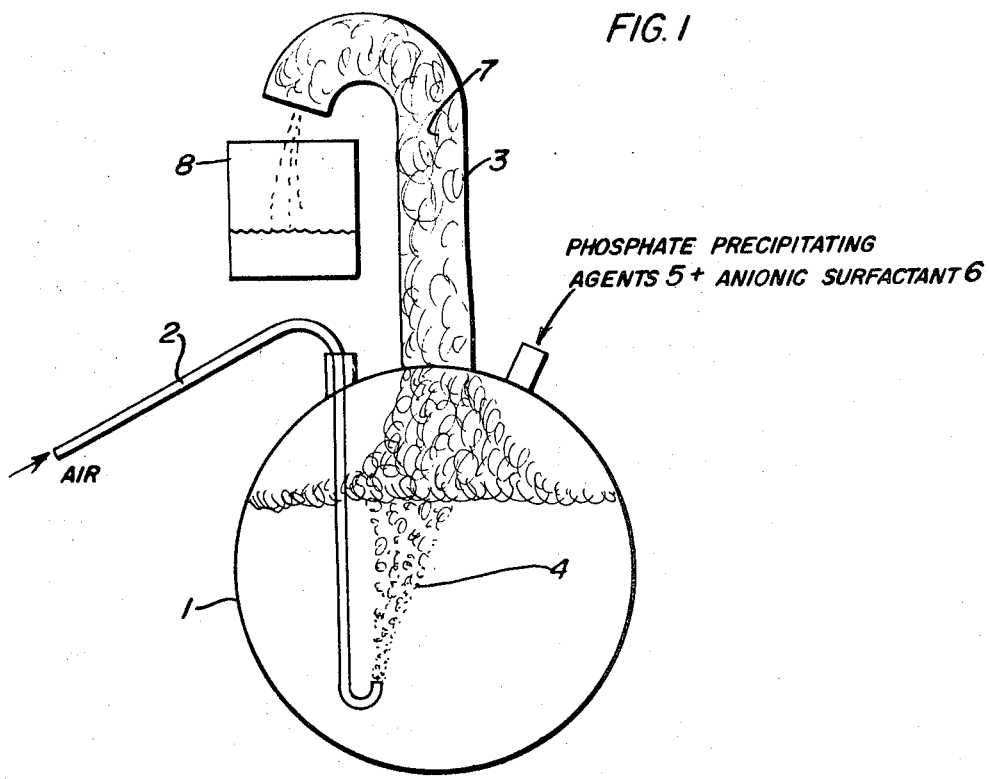
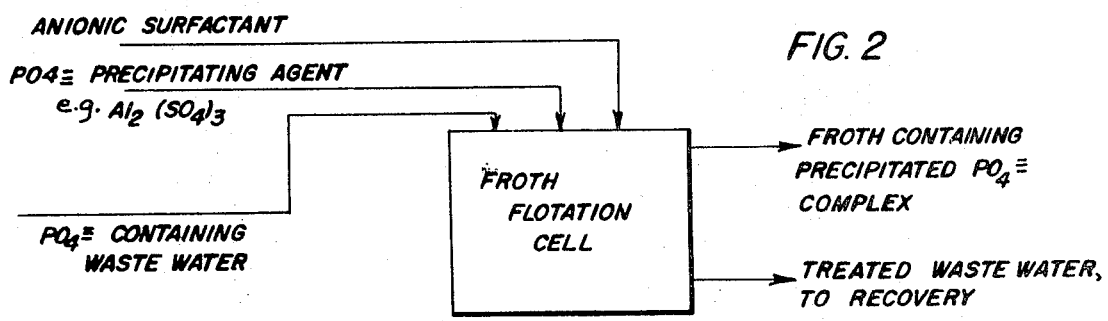

3,583,909
REMOVAL OF PHOSPHATE ION BY FLOTATION WITH AN ANIONIC SURFACTANT
Jacob Block, Rockville, Md., assignor to W. R. Grace & Co., New York, N.Y.
Filed Feb. 5, 1970, Ser. No. 8,869
Int. Cl. B03d 1/00
U.S. Cl. 210—44                     8 Claims

ABSTRACT OF THE DISCLOSURE

Phosphate ions in waste waters can be removed from the water by first adding an ion which, when added in sufficient amounts, would form an insoluble phosphate precipitate, but here, being added in relatively small amounts, does not per se form such precipitate; then adding an anionic surfactant to form a phosphate-containing precipitate, and floating said precipitate to the surface with bubbles. The precipitate which has been floated to the surface can then be removed in the resultant froth, leaving the remainder of the solution relatively free of phosphate ions.

OBJECTIVES OF THE INVENTION

An objective of the present invention is the development of a process for the purification of waste water which comprises the steps of adding to the water small quantities of a phosphate-precipitating cation which will cause phosphate ions in the water to form a soluble phosphate-metal "complex," followed by an anionic surfactant to precipitate the phosphate ions in the form of a surface active precipitate, so that they may be carried to the surface of the water by bubbles, thus enabling the removal of the phosphate ions. As elsewhere mentioned, these "phosphate precipitates" do not actually precipitate phosphate in the very small amounts used in this invention. They are ions which, when used in larger amounts, are known to form water-insoluble phosphates.

It is further an object of this invention to provide a novel treatment of water and aqueous waste by using a "phosphate precipitant" and surfactant to remove displeasing phosphates. It is a further purpose of this invention to make use of an anionic surfactant which may normally be found in waste waters as means of removing phosphates from waste waters. If a surfactant is not present, and one has to be added, the anionic surfactants are preferred, since they are less expensive than cationic surfactants.

These and other objectives of the present invention will become more apparent as the description proceeds.

BACKGROUND

Phosphates are of importance to the growth of algae in waters. Unfortunately, waste water quite often contains an excess of phosphates which lead to a thriving algae population, which causes unsightly algae bloom.

As is well-known, aluminum ions, often in the form of aluminum sulfate ("alum") can be used to separate phosphates from waste waters. However, larger than stoichiometric quantities are needed—usually 2.5 moles of aluminum to remove 1 mole of phosphate. The process of precipitate flotation, i.e., floating a surface active precipitate to the aqueous surface by means of substantially non-reactive gaseous bubbles is known. Some such materials are gaseous hydrocarbons, air, nitrogen, carbon dioxide, oxygen and argon. The forcing of the bubbles through waste water then carries the precipitate to the surface where it can be easily removed.

GENERAL DESCRIPTION

In this invention, "phosphate-precipitating ions" are added to the waste water containing phosphate ions, but not enough to remove phosphate as a precipitate. To this mixture an anionic surfactant is added which forms a surface active precipitate. Since some waste water contains anionic surfactants which have been used as industrial detergents, it often will not be necessary to make this addition. By "phosphate precipitating ions" is meant ions that form a substantially insoluble precipitate with $PO_4^{---}$ ions when sufficient of both are present. Such ions are known to those skilled in the art and include ions such as $Al^{+++}$, $Fe^{+++}$, $Fe^{++}$, $Cu^{++}$, $Pb^{++++}$, $Ba^{++}$, $Bi^{+++}$, $Cd^{++}$, $Ni^{++}$, $Co^{+++}$, $Hg^{++}$, $Sb^{+++}$, $Zr^{++++}$, $Hf^{++++}$, $Sr^{++}$, and $Zn^{++}$. These are suitably added to the waste water in the form of their respective water-soluble salts, e.g., the respective water-soluble sulfates, nitrates, chlorides and the like.

FIG. 1 illustrates the laboratory equipment utilized in this invention. FIG. 2 is a schematic drawing of the invention which may be used when the results of this invention are taken out of the laboratory into the field.

DETAILED DESCRIPTION

In the purification of waste water, it is possible to cause phosphates which pollute the water to be complexed in the water. This state is attained by adding phosphate-precipitating ions to the waste water. The amount added should be about equimolar to the amount of phosphate ions present. Although the ratio of moles of the metal ion phosphate precipitating agent (e.g., $Al^{+++}$) to moles of phosphate is preferably about 1:1, a range of 0.75–1.25:1 is also satisfactory. The less precipitating agent added the less phosphates that will be suspended in the colloidal state. However, if too large a quantity of precipitating agent is added, a precipitate will form, which is in itself a method for phosphate removal. The metal ions which can be used are listed above.

The addition of the metal ion phosphate precipitating agent is followed, if necessary, by addition of either an acid or a base until the pH is in the range of about 2–9 or more, preferably 5–6. This addition is necessary, since the anionic surfactants are generally not effective below a pH of 2.0 and if the pH is too high, the metal phosphate precipitating agent may be ineffective; e.g., aluminum is changed to aluminate at such pH's, preventing the formation of the desired precipitate, when the surfactant is added.

Some anionic surfactants which can be used with the procedure are:

Propylated naphthalenesulfonic acid (Na salt)
Di (2-ethylhexyl) ester of sodium sulfosuccinic acid
Sodium alkylnaphthalenesulfonates generally
Modified alcohol sulfate from coconut fatty acids (Na salt)
Sulfonated monoglyceride of coconut fatty acids (Na salt)
Sodium cetylsulfate
Polymerized alkylated arenesulfonic acid (Na salt)
Alkylated arenesulfonic acid (Na salt)
Sodium oleyl sulfate (from technical oleyl alcohol)
Sodium N-methyl-N-oleyltaurate
Sodium oleylisethionate
Sodium alkylnaphthalenesulfonates generally
Sodium dibutylnaphthalenesulfonate
Highly purified sodium lignin sulfonate
Sodium dodecyl benzenesulfonate
Isopropylated naphthalenesulfonic acid (Na salt)
Sodium decyl benzenesulfonate
Sodium salt of sulfonated condensation product of ethanolamine with a fatty acid C₄H₉CH(C₂H₅)CH₂OSO₃Na
C₄H₉CH(C₂H₅)CH₂CH₂CH(CH₂CH(CH₃)₂)OSO₃Na
C₄H₉CH(C₂H₅)CH₂CH₂CH(CH₂CH₂CH(C₂H₅)₂)
OSO₃Na
Sodium alkylbenzenesulfates generally Of course, if the waste water has a pH within the aforestated range, after the addition of the complexing agent, no pH adjustment is necessary.

The reactions which take place (using sodium octyl sulfonate as the anionic surfactant) can be summarized as follows:

$$PO_4^{---} + Al^{+++} \rightarrow AlPO_4$$

$$AlPO_4 + \tfrac{1}{2}C_8H_{17}SO_3Na \rightarrow AlPO_4[(C_8H_{17}SO_3)Na]_{0.5}$$

(Insoluble Complex)

The amount of metal ion phosphate precipitating agent necessary is determined by the amount of phosphate which it is desired to remove from the waste water. If the solution contains a large amount of phosphate pollutants, it will be necessary to add a greater quantity of the said agent than normally added, but the suggested mole ratio must still be followed. However, if the solution contains a small amount of phosphate pollutant, it will be necessary to add a smaller quantity of such agent than normally added, but again the suggested mole ratio must be followed.

After the desired pH has been attained, an anionic surfactant, approximately in a mole ratio of 0.001–1.50, preferably 0.075–1.0, surfactant:1 phosphate is added to the solution if not already present. The surfactant forms a precipitate with the previously "complexed" phosphate.

Gaseous bubbles are passed through the solution and float the precipitate to the surface.

As can be seen by the following examples, this process can remove significant amounts of phosphates from waste water.

EXAMPLE 1

To a 1 liter solution having a pH of 3.0 and containing 25 p.p.m. of PO₄ (in the form of Na₃PO₄), an equimolar amount of aluminum ion was added (in the form of Al₂(SO₄)₃), and the pH was adjusted to 5 by the addition of sodium hydroxide. A well-known commercially available linear alkyl sulfonate (sodium octyl sulfonate) was then added (0.125 times the molarity of the PO₄) and the resultant precipitate was floated to the surface of the solution (see FIG. 1). 146 ml. of foam was collected. The foam was found to contain 48 percent of the total phosphate originally present. An additional charge of the same linear alkyl sulfonate as previously used (equal in concentration to the first charge) resulted in the total phosphate removal of 71 percent in a total volume of 306 ml. of foam.

EXAMPLE 2

Example 1 was repeated except that the pH was adjusted to 6 by the addition of sodium hydroxide and 66 percent of the phosphate was collected in 300 ml. of foam.

EXAMPLE 3

Example 1 was repeated except that the pH was adjusted to 4 by the addition of sodium hydroxide and 64 percent of the phosphate was collected in 296 ml. of foam.

EXAMPLE 4

Example 1 was repeated except that the pH was maintained at 3.0, its original pH, and 65 percent of the phosphate was collected in 598 ml. of foam.

EXAMPLE 5

Example 1 was repeated at an adjusted pH of 9, which was attained by adding sodium hydroxide and 62 percent of the phosphate was collected in 293 ml. of foam.

EXAMPLE 6

The general procedure of Example 1 was followed and 1 liter of a secondary sewage effluent containing 10 p.p.m. PO₄, was treated with aluminum ions (in the form of Al₂(SO₄)₃) and sodium octyl sulfonate, each equimolar to the PO₄, at a pH of 6. The total foam collected was 174 ml., which contained 54 percent of the total phosphate.

EXAMPLE 7

Example 1 was repeated except that iron ions (in the form of Fe₂(SO₄)₃) were used instead of aluminum ions. The analysis indicated that there was a total phosphate removal of 68 percent.

EXAMPLE 8

The general procedure of Example 1 was repeated on a sample of waste water which analyzed as 9.25 p.p.m. PO₄⁻⁻⁻ and 30 p.p.m. COD (chemical oxygen demand, defined as the oxygen equivalent of that portion of the organic matter that is susceptible to oxidation by a strong chemical oxidant).

In this experiment, sodium lauryl sulfate was the chosen anionic surfactant. Analysis after treatment revealed that the total foam collected was 165 ml., which contained 48 percent of the total phosphate.

When the remaining solution was treated with an addition charge of sodium lauryl sulfate (equal in concentration to the first charge) a total phosphate removal of 72 percent in a total volume of 312 ml. of foam was removed from the solution.

Turning now to FIG. 1, the solution which contained excess PO₄⁻⁻⁻ was put into container 1, to which was connected an air line 2, which in turn was connected to a compressed gas cylinder. A precipitating agent 5 was added at the top of the container 1, followed by the addition of anionic surfactant 6, also through the top of the container. As air was released into the solution via the air line 2, bubbles 4 floated to the top of the solution and deposited a foam 7, which contained the precipitated phosphate complex, which was easily removed. A glass tube 3 then removed the foam to a collector 8 which collected the phosphate-containing foam.

Turning now to FIG. 2, which is a schematic drawing of the invention, the anionic surfactant, the phosphate-complexing agent, and the phosphate-complexing waste water are added to a froth flotation cell, in the sequence mentioned above. The type of froth flotation cell that is used is not of critical importance, and any one of many, including Fagergren level-type machines with internal (submerged) air pumps, Cascade machines, Forrester cells, Hunt cells, Welsch cells, Fahrenwald machines and machines with external blowers can be used to achieve proper flotation. The froth containing the precipitated PO₄⁻⁻⁻ complex, which forms at the top of the cell, is removed to a waste container, and the treated waste water, now minus the excessive phosphate ions, is removed from the cell to be used or released as desired.

What is claimed is:

1. The process of removing dissolved phosphate from a solution containing the same, comprising: adding substantially not more than 0.75–1.25 mole phosphate-precipitating agent per mole of phosphate present in said solution to thereby form a soluble phosphate containing complex, said amount of phosphate-precipitating agent being sufficient to form a soluble phosphate-containing complex, but not sufficient to form a precipitate, followed by adding an anionic detergent wherein the molarity of the anionic detergent is 0.001–1.50 times the molarity of the phosphate ion to thereby form a precipitate with said complex; floating said precipitate to the surface of said solution by froth flotation, and removing the resulting froth from said solution.

2. The process according to claim 1 in which the phosphate-precipitating agent is an ion selected from the group consisting of aluminum, copper, lead, barium, bismuth, cadmium, iron, nickel, cobalt, zirconium, hafnium, mercury, tin, strontium, and zinc.

3. The process according to claim 2 in which the phosphate-precipitating agent is the aluminum ion.

4. The process according to claim 2 in which the phosphate-precipitating agent is the iron ion.

5. The process according to claim 1 in which the anionic detergent is a member of the group consisting of sodium octyl sulfonate or sodium lauryl sulfate.

6. The process according to claim 3 in which the amount of aluminum added is equimolar with respect to the phosphate ions.

7. The process according to claim 4 in which the amount of iron added is equimolar with respect to the phosphate ions.

8. The process according to claim 1 in which the pH of the solution is in the range of 2–9 prior to flotation.

References Cited

UNITED STATES PATENTS

| | | | |
|---|---|---|---|
| 3,147,217 | 9/1964 | Halton | 210—44 |
| 3,200,069 | 8/1965 | Eisenhaver | 210—63 |
| 3,423,309 | 1/1969 | Albertson | 210—18X |

OTHER REFERENCES

Device to Recover and Reuse Laundry Water Developed by Navy, bulletin of U.S. Dept. of Commerce, OTS 62–499, Sept. 18, 1962, 1 page.

MICHAEL ROGERS, Primary Examiner

U.S. Cl. X.R.

23—105; 210—53